United States Patent [19]

Roxton et al.

[11] Patent Number: 4,750,568

[45] Date of Patent: Jun. 14, 1988

[54] PNEUMATIC RESCUE TOOL

[75] Inventors: George F. Roxton, Wheeling; Howard Leibovitz, Chicago, both of Ill.

[73] Assignee: Paratech Incorporated, Frankfort, Ill.

[21] Appl. No.: 77,087

[22] Filed: Jul. 20, 1987

Related U.S. Application Data

[63] Continuation of Ser. No. 899,759, Aug. 21, 1986, abandoned, which is a continuation of Ser. No. 611,346, May 17, 1984, abandoned.

[51] Int. Cl.⁴ .......... B23B 45/16

[52] U.S. Cl. .......... 173/121; 173/134

[58] Field of Search .......... 173/18, 116, 121, 168, 173/169, 134, 112; 91/243, 239, 240

[56] References Cited

U.S. PATENT DOCUMENTS

| | | | |
|---|---|---|---|
| 2,199,337 | 4/1940 | Gartin | 91/243 X |
| 3,177,952 | 4/1965 | West | 173/121 |
| 3,241,622 | 3/1966 | Ottosson et al. | 173/18 |
| 3,250,334 | 5/1966 | Sussman | 173/18 |
| 3,305,953 | 2/1967 | Mehren et al. | 173/121 |
| 3,802,516 | 4/1974 | Speicher | 173/119 X |

*Primary Examiner*—E. R. Kazenske

*Assistant Examiner*—Willmon Fridie, Jr.

*Attorney, Agent, or Firm*—Haight & Hofeldt

[57] ABSTRACT

A hand-held pneumatic rescue tool may be driven from a bottled compressed gas. The driving gas is used only for the blow-striking stroke, while a compression spring is used to provide a force for the return stroke that is independent of the pressure of the driving gas. Thus, the pressure of the driving gas may be varied to adjust the impact force of the blows struck, without adversely affecting operation of the tool. By appropriate valving, the tool will operate continuously and automatically so long as driving gas is supplied, as determined by the operator.

14 Claims, 3 Drawing Sheets

PNEUMATIC RESCUE TOOL

This is a continuation of application Ser. No. 899,759, filed Aug. 21, 1986, now abandoned, which is a continuation of application Ser. No. 611,346, filed May 17, 1984, now abandoned.

BACKGROUND OF THE INVENTION

1. Field of the Invention

This invention relates generally to pneumatically actuated percussive tools, and more specifically, this invention relates to a pneumatically actuated percussive tool which may be energized by a bottled pressurized gas, with specific reference to its use as a rescue tool.

2. Description of the Prior Art

Pneumatically actuated tools have been used for a large variety of purposes, such as paving breakers, rock drills, coal mine stopers, chipping hammers, boulder breakers, etc. Accordingly, there has been a great deal of developmental work done over a period of many years to enhance and adapt these pneumatic tools for specific applications. However, these developmental efforts have not included a tool that meets the requirements for use in emergency rescue situations, such as those encountered by firemen and emergency rescue teams.

One of the requirements of a tool for use in the emergency rescue area is that it be relatively small, since the rescuer frequently has to operate in a limited space. Along the same lines, the rescue tool should be relatively light and maneuverable, since the operator may not only be faced with a limited space, but may also be forced to maneuver from awkward positions or rapidly shift from one area to another.

As it would be very difficult to drag along a compressor, and as the time necessary to get the compressor started and producing the requisite pressure could be vital, it is preferable that the tool be capable of operating from pressurized gas maintained in a suitable container, frequently referred to as "bottled" gas. Since the rescue tool will be called upon to perform a variety of different functions, it would be helpful if the tool could be adjusted to provide blows of differing force, for these different applications.

Since potentially combustible fumes are frequently encountered in emergency rescue work, the use of a pneumatically driven rescue tool, rather than an electrically driven tool, has certain safety advantages. (In this regard, it should be noted that the term "pneumatic" is used herein to encompass both the use of air and the use of other driving gases. Normally, compressed air would be the driving gas, although in some applications some other type of driving gas might be preferable.)

Prior art pneumatic devices are not capable of satisfying the requirements for use in emergency rescue work, although various attempts have been made to deal with one or more of these requirements. Therefore, a pneumatic rescue tool that can satisfy the rigorous requirements in emergency situations is needed.

SUMMARY OF THE INVENTION

The present invention provides a pneumatic rescue tool that may be actuated from bottled gas. By varying the pressure of the driving gas the impact force of the blows generated by the tool can be adjusted, so that the tool can be used for a variety of different purposes. The range of pressures over which the tool will function in its intended fashion is relatively wide, particularly when compared with conventional tools in which a variation from the desired pressure of as little as 20 or 30 percent seriously impedes normal functioning of the tool. These features are achieved with a tool that is relatively light weight and small, and which may be easily handled and operated.

To achieve these features, the rescue tool of the present invention has an elongated casing with a bore in which a hammer is reciprocably mounted. The blow-striking stroke of the hammer is achieved by introducing a driving gas into the bore of the casing to propel the hammer. A valve member having two body portions interconnected by a shaft is utilized to close and open a passageway conveying the driving gas.

When the hammer is at rest, it is in a position to produce the blow-striking stroke. When the hammer is in its rest position, the valve member is in a position that leaves the passageway open to convey driving gas to the bore of the casing. Accordingly, this driving gas will propel the hammer on its blow-striking stroke. After the hammer has progressed beyond a certain point, a first valve actuating arrangement will cause the valve member to close the passageway.

This first valve actuating arrangement includes a channel which extends from an opening in the bore of the casing to a chamber in which one of the body portions of the valve member is located. This body portion has a sealing fit with the surface of the chamber in which it is located, so that the driving gas in the channel forces the valve member to close the passageway. An enlarged head portion on the hammer also has a sealing fit with the surface of the bore, so that the driving gas does not reach the channel until after the head portion has passed the end of the channel opening into the bore.

At the time that the valve member closes the passageway, a venting arrangement is opened to reduce the pressure to atmospheric in the portion of the bore where the driving gas had been. This venting may be achieve by venting ports that are opened by the valve member when it closes the passageway.

With removal of the driving gas, the hammer is urged toward its rest position by a return force that is independent of the pressure of the driving gas. In this case, the return force is provided by a compression spring. The compression spring is located in a larger diameter section of the bore adjacent the end into which the driving gas is inserted. This compression spring is positioned between the head portion of the hammer and a shoulder produced at the juncture between the larger diameter section of the bore and a smaller diameter section adjacent the other end thereof.

Because of the return force that is independent of the pressure of the driving gas, the pressure of the driving gas may be regulated over a relatively wide range to vary the impact force of the hammer. In order to achieve this result, of course, the compression spring must be selected to produce a return force that is sufficiently large to return the hammer to its rest position, but which also interferes as little as possible with the blow of the hammer. Use of the spring is also instrumental in providing a tool that may be driven by bottled gas, due to the efficiencies that result from not having to use the gas to drive the hammer in its return stroke.

As the hammer nears its rest position, it is arranged to be mechanically interconnected with said valve member, such as by an abutment on the hammer engaging a rod extending from the valve member, to drive the valve member to close the exhaust ports and open the passageway. Thus, this provides a second valve actuating arrangement which is basically actuated by the return force of the compression spring.

In order to provide the requisite ease of handling, an extending handle or grip, somewhat like the grip of a hand-held gun, is mounted on the casing. A driving gas control in the form of a pivoted trigger is provided on the grip. Thus, the tool may be held in one hand and actuated by squeezing the trigger on the grip, when it is desired. So long as the trigger is actuated to convey driving gas to the passageway, the hammer will be continuously and automatically reciprocated.

The force of the blow-striking strokes of the hammer is conveyed to a tool bit that is releasably mounted in the end of the casing. A spring biased retaining sleeve may be manually actuated to permit relatively non-resilient mounting balls to be forced out into the larger diameter section of the retaining sleeve to permit tool bits to be removed and inserted. Releasing of the sleeve results in the spring bias moving the smaller diameter portion of the sleeve to force the mounting balls inwardly and prevent removal of the tool bit.

Thus, a pneumatic rescue tool that may be actuated from bottled gas and which meets the other requirements for a rescue tool is provided.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
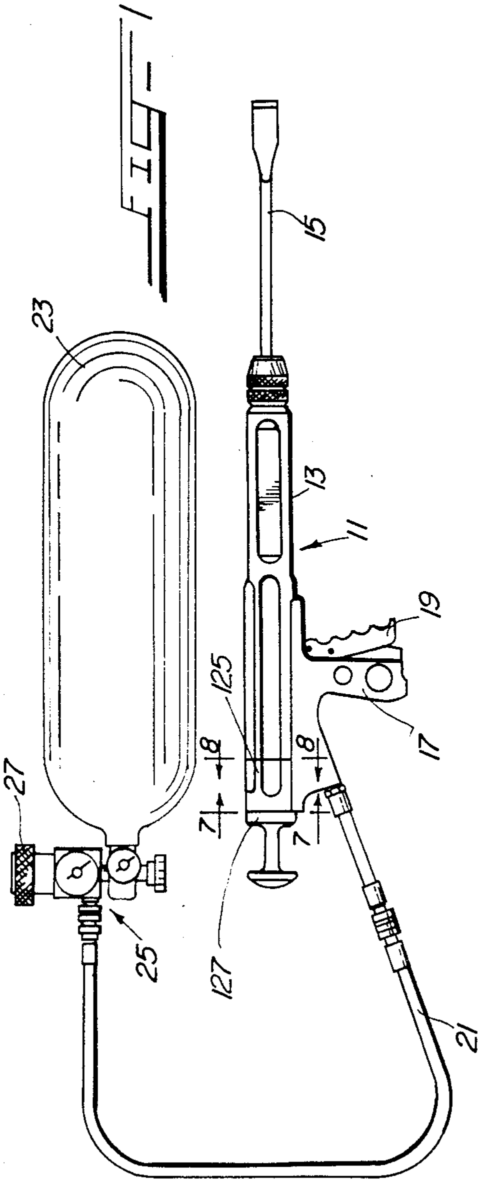
FIG. 1 is a front elevational view of a pneumatic rescue tool constructed in accordance with the present invention, shown corrected to a container of pressurized driving gas.
Figure 7:
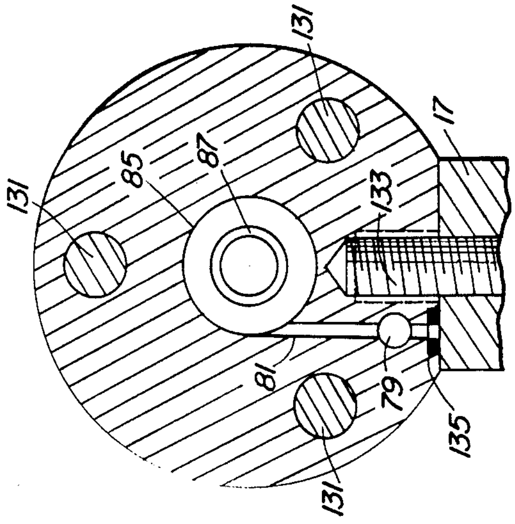
FIG. 7 is a cross-sectional view taken along line 7—7 of FIG. 1.
Figure 8:
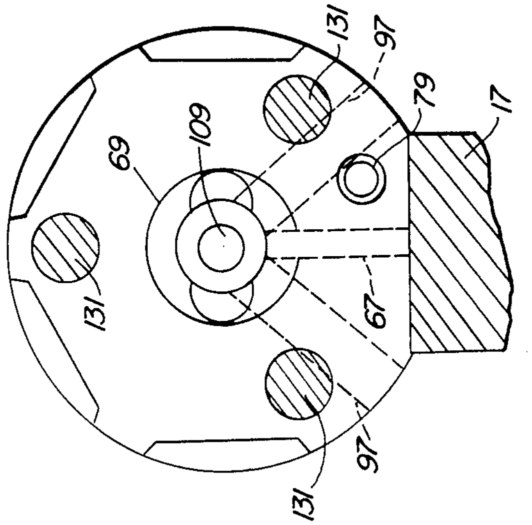
FIG. 8 is a cross-sectional view taken along line 8—8 of FIG. 1.

A pneumatic rescue tool 11 is illustrated in FIG. 1. Rescue tool 11 has a casing 13 in which a tool bit 15 may be releasably secured. The tool 11 is held by means of handle or grip 17, on which is pivotably mounted a trigger mechanism 19 to control the introduction of driving gas into tool 11 from a line 21. Gas in line 21 is obtained from a container or "bottle" 23 in which a pressurized driving gas is stored. An adjustable valve mechanism 25 may be adjusted by means of a handle 27 to produce a desired pressure for the driving gas in line 21.

Figure 2:
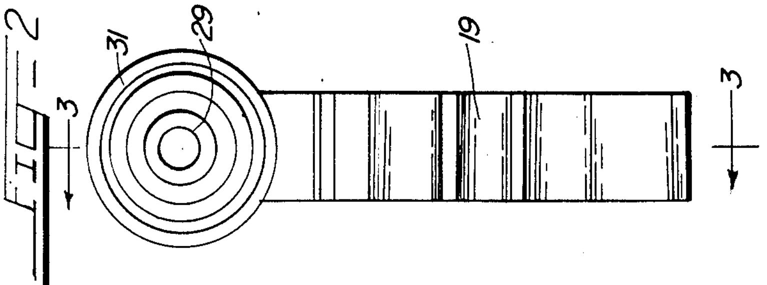
FIG. 2 is an enlarged right side elevational view of the rescue tool of FIG. 1 with the tool bit removed.

From the right side elevational view of FIG. 2, it is possible to see the opening 29 in which the shaft of the tool bit 15 is inserted. A manually actuatable retainer sleeve 31 will lock the tool bit in place unless manually forced back against a bias spring to permit easy and rapid removal or insertion of tool bits.

Figure 3:
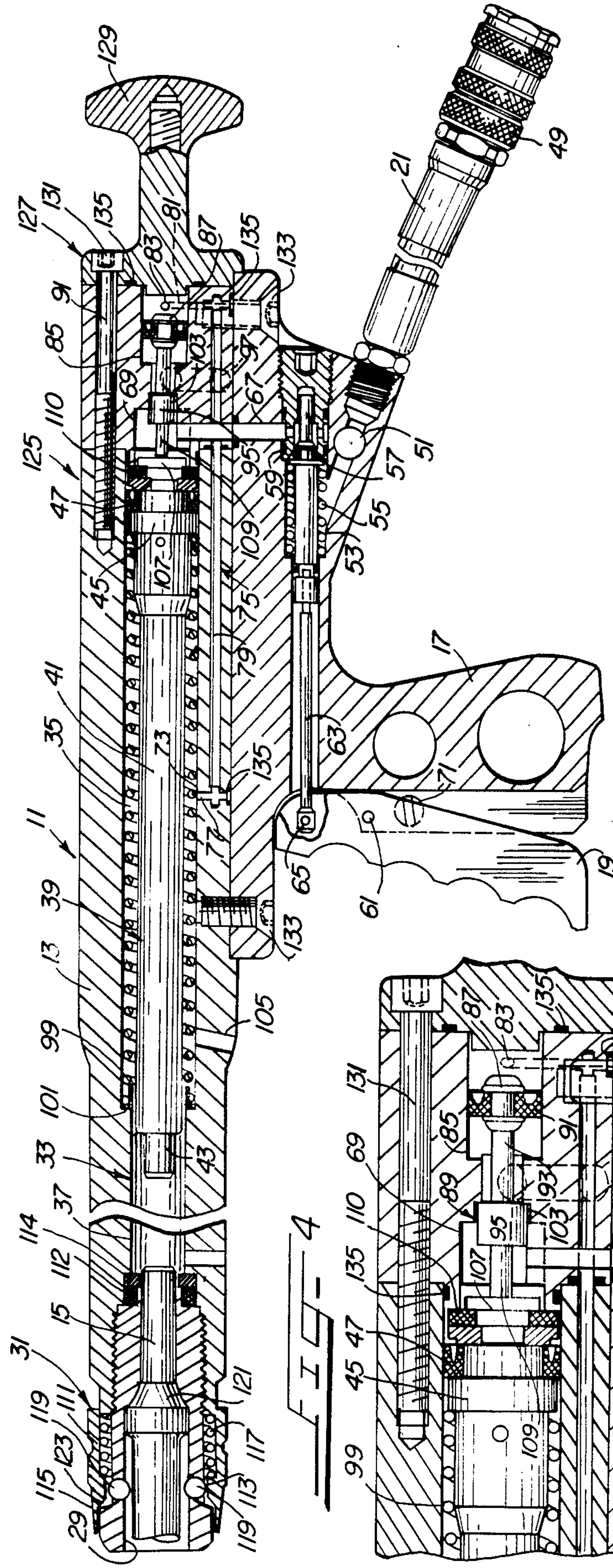
FIG. 3 is a cross-sectional view taken along line 3—3 of FIG. 2, showing the tool with the hammer in the rest position.
Figure 4:
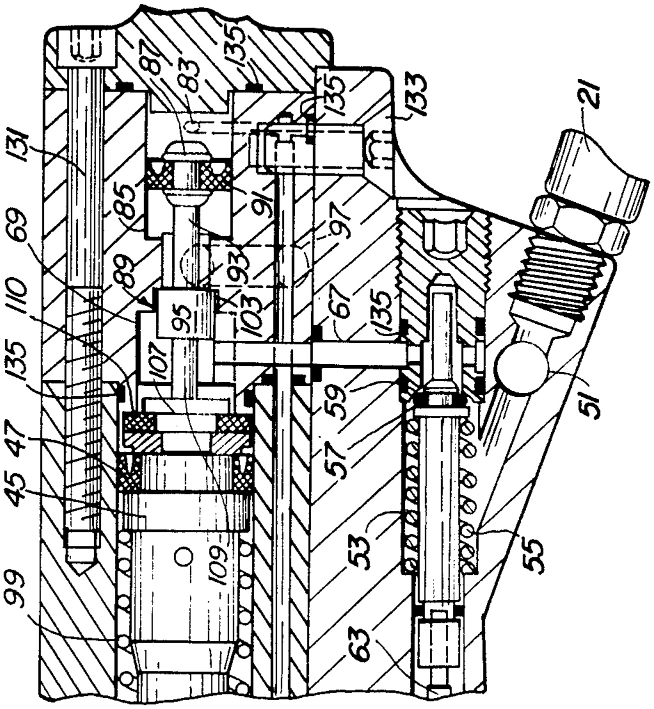
FIG. 4 is an enlarged portion of the cross-sectional view of FIG. 3 illustrating in greater detail the valving action.
Figure 5:
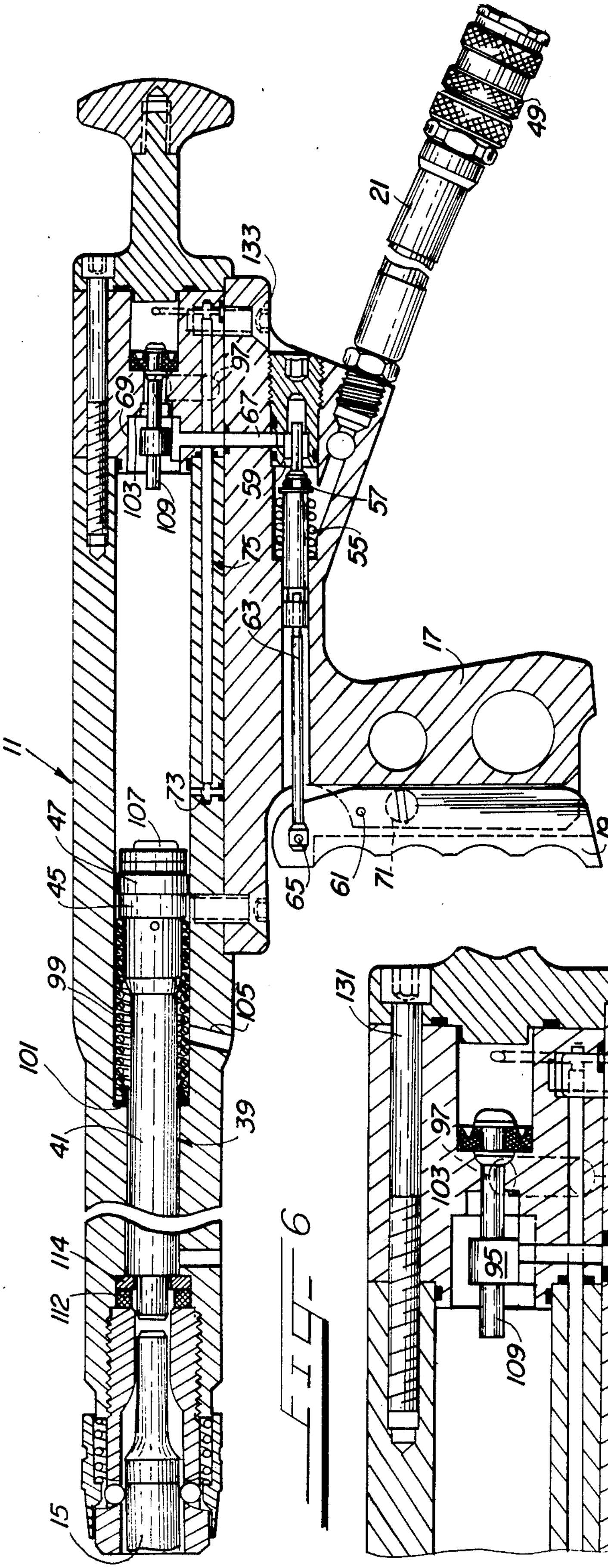
FIG. 5 is a cross-sectional view similar to that of FIG. 3 but with the hammer shown in its fully extended blow-striking position.
Figure 6:
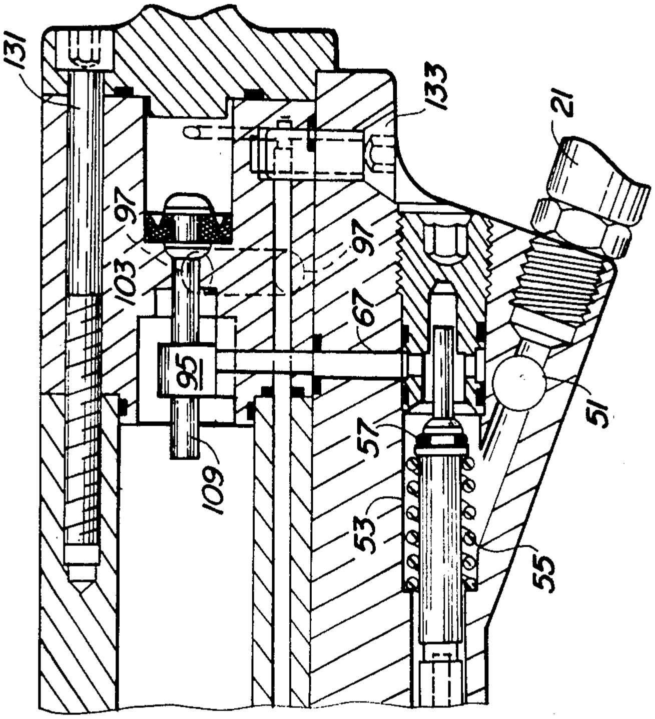
FIG. 6 is an enlarged portion of the cross-sectional view of FIG. 5 similar to FIG. 4.

To gain an understanding of the structure and operation of pneumatic rescue tool 11, reference may be made to the cross-sectional views of FIGS. 3–6. The views of FIGS. 3 and 4 are identical to those of FIGS. 5 and 6, respectively, except that the tool is in two different stages of operation. In FIGS. 3 and 4, trigger 19 is in its unactuated position and the tool is in its quiescent or rest state. FIGS. 5 and 6, on the other hand, show the tool in the state immediately after delivery of a blow to the tool bit 15.

From these FIGURES it may be seen that casing 13 has a bore 33 with a larger diameter section 35 and a smaller diameter section 37. A hammer 39 is mounted for reciprocable motion in bore 33. Hammer 39 has a smaller diameter portion 41 that fits into section 37 of bore 33 with a relatively close fit. An extending striking portion 43 is located at the end of portion 41 of hammer 39 to strike the tool bit 15. Hammer 39 also has a larger diameter head portion 45 at the end of the smaller diameter shaft portion 41. Head portion 45 has a fairly close fit in the larger diameter section 35 of bore 33. A seal 47 is located in head portion 45 to eliminate leakage of driving gas between head portion 45 and the surface of section 35 of bore 33.

Line or hose 21 is provided with a locking safety coupling 49. Driving gas in line 21 is passed through a filter 51, where lubricant, such as a suitable grade of oil, is introduced. Driving gas passing through filter 51 is conveyed to a chamber 53, where a bias spring 55 maintains an O-ring 57 in contact with a valve seat 59. The result is that the driving gas cannot pass beyond chamber 53. As previously indicated, and as may be seen from FIG. 3, trigger 19 is in the unactuated position in these conditions.

With reference to FIG. 5, it may be seen that manual actuation of trigger 19 rotates the trigger around its pivotal mounting 61. This causes a connecting rod 63, fastened to trigger 19 at point 65, to pull O-ring 57 away from valve seat 59. This permits driving gas from line 21 to enter a passageway 67 and thence pass to a cavity 69 that opens into the end of bore 33. With reference back to FIGS. 3 and 4, the conditions shown in these FIGURES would be those immediately after actuation of trigger 19. Incidentally, a stop 71 may be provided to prevent inadvertent actuation of trigger 19. The screw 71 would be backed out to engage an appropriate slot (not shown) in trigger 19.

With the insertion of driving gas into passageway 67, the driving gas bears against hammer 39 and propels it in a blow-striking stroke. As hammer 39 is propelled toward tool bit 15, seal 47 will pass the end 73 of a channel 75. End 73 of channel 75 opens into the larger diameter section 35 of bore 33. As seal 47 passes end 73 of channel 75, driving gas will pass through a short vertical section 77, a relatively long horizontal section 79, and a shorter vertical section 81 of channel 75. The driving gas passing through channel 75 exits at point 83 into a chamber 85.

A first body portion 87 of a valve member 89 is located in chamber 85. Body portion 87 includes a seal 91 that provides a sealing fit between body portion 87 and the surface of chamber 85. Thus, the driving gas inserted into chamber 85 drives the valve member 89 toward the left (FIG. 4 orientation).

Body portion 87 of valve member 89 is connected by a shaft 93 to another body portion 95. Actuation of valve member 89 through the channel 75, which thus provides a first valve actuating structure, results in body portion 95 moving to close passageway 67, as shown in FIGS. 5 and 6. As valve member body portion 95 moves to close passageway 67, it also opens vents 97 to return the pressure in section 35 of bore 33 to atmospheric.

At this point in the operating sequence, a return force is provided by a compression spring 99. Compression spring 99 is located between head portion 45 of hammer 39 and a shoulder 101 formed at the junction between sections 35 and 37 of bore 33. Since compression spring 99 provides a return force that is independent of the pressure of the driving gas, it means that the pressure of the driving gas can be varied to achieve differing impact forces, thus providing for different uses of the tool. Also, by utilizing the return force of the spring rather than pressurized gas, it means that only half the gas is used which increases the efficiency of the tool and permits the utilization of a bottled gas for actuation.

With reference to FIG. 5, the position of the hammer 39 is shown at the end of the blow-striking stroke, preparatory to the return stroke. Passageway 67 is closed by body portion 95 of valve member 89, and valving ports 97 are opened by the removal of body portion 95 from its tight fit in the opening 103. Thus, any pressure of the driving gas opposing the return force of spring 99 is vented.

As hammer 39 is returned toward its rest position, seal 47 will pass over end 73 of channel 75. If the driving gas in channel 75 had not been vented through ports 97, it is now exhausted through vent 105. Vent 105 also serves to prevent the build-up of any pressure to oppose the blow-striking stroke of hammer 39.

Referring back to FIG. 3, as hammer 39 nears its rest position at the end of the return stroke, an abutment 107 on the end of hammer 39 contacts an engaging rod 109 that extends outwardly from body portion 95 of valve member 89. As a result of this contact, valve member 89 is driven by the force of spring 99 to open passageway 67 and close valving ports 97. At this point the tool is ready for its next blow-striking stroke, and the cycle is automatically and continuously repeated so long as driving gas is supplied to passageway 67.

A bumper 110 is located on head portion 45 of hammer 39 to protect casing 13 from mechanical shocks on the return stroke of hammer 39. A similar bumper 112 is used to protect casing 13 on the blow-striking stroke. Bumper 112 is held in position by washer 114, which is contacted by hammer 39.

Tool bit 15 is removably fastened into casing 13 by an easily manipulated mechanism including the sliding retainer sleeve 31. Sleeve 31 has a smaller diameter portion 111 with an extending shoulder 113 and a larger diameter portion 115. A bias spring 117 urges sleeve 31 to a position where shoulder 113 engages relatively non-resilient spheroids, such as metal balls 119, to push them toward the axis of casing 13. In this position an extending ring 121 on tool bit 15 is prevented from passing balls 119, so that the tool bit 15 is held in tool 11.

To remove tool bit 15, sleeve 31 is pushed against the force of spring 117 to position the larger diameter portion 115 of sleeve 31 over balls 119. As the tool bit is then pulled outwardly the balls 119 will be pushed outwardly from the axis of casing 13, so that ring 121 can pass the balls. After a new bit has been inserted, the force of spring 117 will cause a ramp 123 on shoulder 113 to force balls 119 into position under shoulder 113 to lock tool bit 15 into tool 11.

Tool 11 is formed of four sections, in this preferred embodiment. Casing 13 is adjacent to the control valve housing 125, which contains the valve member 89. At the other end of housing 125 is an end plug 127 with a handle 129. Bolts 131 connect these three sections together. Handle or grip 17 is connected to casing 13 and housing 125 by mounting bolts 133. In order to prevent undesired leakage of air, seals 135 are located along various joints and at various pressured locations to minimize leakage.

It should be understood that various modifications, changes and variations may be made in the arrangement, operation and details of construction of the elements disclosed herein without departing from the spirit and scope of this invention.

We claim:

1. A hand-held pneumatic rescue tool capable of operating over a relatively wide range of driving gas presures comprising:

an elongated casing having a bore formed therein;

a handle secured to said casing to be grasped by an operator to hold and position the tool;

a hammer mounted for the reciprocable motion in the bore of said casing, said hammer having a rest position from which it is driven to produce a blow-striking stroke, said hammer dividing said bore into two chambers, one of which is continuously vented to the atmosphere;

a passageway in said casing for conveying the driving gas to that portion of the bore of said casing defining the other of said two chambers, the driving gas propelling said hammer in a blow-striking stroke along the bore of said casing;

a valve member to open and close said passageway;

first valve actuating means to cause said valve member to close said passageway after said hammer has been propelled a predetermined distance along the bore of said casing;

venting means to open said portion of said casing into which the driving gas is inserted when said passageway is closed;

return force means to urge said hammer to its rest position with a force independent of the pressure of said driving gas;

second valve actuating means responsive to the force applied to said hammer by said return force means to cause said valve member to open said passageway when said hammer is near its rest position; and manually actuatable driving gas control means to selectively determine when the driving gas will be conveyed to said valve member, said hammer being continuously and automatically reciprocated so long as said control means causes the driving gas to be conveyed to said passageway.

2. A pneumatic rescue tool as claimed in claim 1 wherein said return force means comprises a compression spring.

3. A pneumatic rescue tool as claimed in claim 2 wherein said spring is selected to produce a force sufficiently large to return said hammer to its rest position while providing as little interference with the force of said hammer's blow as possible.

4. A pneumatic rescue tool as claimed in claim 2 wherein:

the bore of said casing comprises a first larger diameter section adjacent the end of said casing where the driving gas is inserted and a second smaller diameter section adjacent the other end of said casing;

said hammer comprises a shaft portion that extends into said second section of the bore of said casing with a relatively close fit and a head portion that has a diameter substantially the same as the diameter of said first section of the bore of said casing; and said spring is located in said first section of the bore of said casing around said hammer, said spring extending between said head of said hammer and a shoulder formed at the juncture of said first and second bore sections of said casing.

5. A pneumatic rescue tool as claimed in claim 4 wherein said head portion of said hammer comprises a seal to eliminate leakage of the driving gas between said head portion and the surface of said first section of the bore of said casing.

6. A pneumatic rescue tool as claimed in claim 4 wherein said valve member comprises:

a first body portion movable between a position over the end of said passageway to close it and a position spaced from the end of said passageway to open it;

a second body portion positioned in a chamber; said second body portion contacting the surface of said chamber with a relatively gas-tight fit; and a shaft interconnecting said body portions.

7. A pneumatic rescue tool as claimed in claim 6 wherein said first valve actuating means comprises a channel having an end in said first section of the bore of said casing and extending to said chamber in which said second body portion of said valve member is located, driving gas passing through said channel engaging said second body portion of said valve members to move said valve member to position said first body portion thereof to close said passageway after said head portion of said hammer has passed the end of said channel in the bore of said casing.

8. A pneumatic rescue tool as claimed in claim 6 wherein said second valve actuating means comprises engaging means to mechanically interconnect said hammer and said valve member when said hammer is at or near its rest position so that the force of said spring on said hammer causes said valve member to be moved to open said passageway.

9. A pneumatic rescue tool as claimed in claim 8 wherein said engaging means comprises:

an engaging rod extending toward said hammer from said first body portion of said valve member; and an abutment area formed on the end of said hammer to contact said engaging rod as said hammer means is in its rest position.

10. A pneumatic rescue tool as claimed in claim 6 wherein said venting means comprises a venting port, said first body portion of said valve member closing said venting port when said passageway is open and said venting port being opened when said valve member is actuated to have said first body portion thereof close said passageway.

11. A pneumatic rescue tool as claimed in claim 1 wherein:

said handle comprises an extending grip mounted on said casing; and said driving gas control means comprises a privoted trigger on said grip.

12. A pneumatic rescue tool as claimed in claim 1 and further comprising a tool bit to be impacted by said hammer at the end of its blow-striking stroke.

13. A pneumatic rescue tool as claimed in claim 12 wherein said tool bit has an extending ring thereon and is releasably locked in said casing by a structure comprising:

a plurality of relatively non-resilient spheroids held in a race formed in said casing;

a restraining sleeve to fit over said spheroids and maintain them in said race;

an extending shoulder formed on said sleeve;

a bias spring to position said shoulder over said spheroids when said tool bit is locked into said casing; and a larger diameter portion of said sleeve, sliding said sleeve against the force of said bias spring to place said large diameter portion over said spheroids to permit removal or insertion of said tool bit.

14. A hand-held pneumatic rescue tool system capable of operating over a relatively wide range of driving gas pressures comprising:

a container for a driving gas maintained under pressure;

a manual control for adjusting the pressure of gas released from said container to determine the impact force generated by the pneumatic rescue tool;

means to convey compressed gas from said container to the pneumatic rescue tool;

an elongated casing of the rescue tool having a bore formed therein, said bore having a first larger diameter and a second smaller diameter section;

a handle secured to said casing to be grasped by an operator to hold and position the tool;

a hammer mounted for reciprocable motion in the bore of said casing between a rest position and a blowstriking position, said hammer having a shaft portion to extend into said second section of said bore with a relatively close fit and a head portion having a diameter substantially the same as the diameter of said first section of said bore;

a passageway in said casing for conveying the driving gas to the end of said first section of said bore away from said second section thereof;

a seal in said head portion of said hammer to eliminate leakage of the driving gas between said head portion of said hammer and the surface of said first section of said bore;

a venting port to which gas can flow from the end of said first section of said bore away from said second section thereof;

a valve member having interconnected first and second body portions, said first body portion arranged to open and close said passageway and to block gas flow to said venting port when said passageway is open and to permit gas flow to said venting port when said passageway is closed, said second body portion being positioned in a chamber with a seal between said second body portion and the surface of said chamber;

a channel formed in said casing and extending between said first section of said bore and said chamber, the opening of said channel in said bore being positioned so that after said hammer has moved a predetermined position along its blow-striking stroke said seal on said head portion will pass the opening of said channel to convey driving gas to said chamber to cause said valve member to close said passageway and open said venting port;

a compression spring to provide a force to return said hammer to its rest position after it strikes a blow, said spring located in said first section of said bore between a shoulder formed at the juncture of said first and second section of said bore and said head portion of said hammer;

an engaging rod on said valve member extending toward said hammer;

an abutment area on said hammer to contact said engaging rod as said hammer nears its rest position, said hammer under the force of said spring driving said valve member to close said venting port and open said passageway; and a manually actuatable driving gas control means to selectively determine when the driving gas will be conveyed to said passageway, said hammer being continuously and automatically reciprocated so long as said control means causes the driving gas to be conveyed to said passageway.

* * * * *